US005380992A

United States Patent [19]

Damen et al.

[11] Patent Number: 5,380,992

[45] Date of Patent: Jan. 10, 1995

[54] BAR CODE DETECTION USING BACKGROUND-CORRELATED BAR CRITERION FOR ASCERTAINING THE PRESENCE OF A BAR

[75] Inventors: Jozef T. W. Damen, Leidschendam; Hong S. Tan, Zoetermeer, both of Netherlands

[73] Assignee: Koninklijke PTT Nederland B.V., Groningen, Netherlands

[21] Appl. No.: 924,372

[22] Filed: Jul. 31, 1992

Related U.S. Application Data

[63] Continuation of Ser. No. 547,691, Jul. 2, 1990, abandoned.

[30] Foreign Application Priority Data

Jul. 10, 1989 [NL] Netherlands ........................ 8901759

[51] Int. Cl.[6] ........................................ G06K 7/10

[52] U.S. Cl. .................................. 235/462; 235/491; 250/271

[58] Field of Search ...................... 235/462, 466, 491; 358/464; 364/571.01, 571.02, 571.04, 571.05; 250/214 AL, 214 B, 271

[56] References Cited

U.S. PATENT DOCUMENTS

| | | | |
|---|---|---|---|
| 3,760,161 | 9/1973 | Lohne et al. | 235/462 |
| 3,800,078 | 3/1974 | Cochran et al. | |
| 3,969,612 | 7/1976 | McJohnson | 235/466 |
| 4,160,902 | 7/1979 | van Jijngaarden | |
| 4,466,121 | 8/1984 | Damen et al. | 382/9 |
| 4,691,240 | 9/1987 | Kurusu et al. | 382/50 |
| 4,777,357 | 10/1988 | Harada et al. | 235/462 X |
| 4,798,943 | 1/1989 | Cherry | 235/466 |
| 4,801,788 | 1/1989 | Osaka | 235/462 |
| 4,822,986 | 4/1989 | Guthmueller et al. | 235/462 |
| 4,937,764 | 6/1990 | Komatsu et al. | 364/571.01 |
| 4,983,817 | 1/1991 | Dolash et al. | 235/462 |
| 5,025,480 | 6/1991 | Morton et al. | 382/50 |

*Primary Examiner*—Davis L. Willis
*Assistant Examiner*—Edward H. Sikorski
*Attorney, Agent, or Firm*—Frishauf, Holtz, Goodman & Woodward

[57] ABSTRACT

A bar code signal essentially forms a cross-section of a bar code pattern which through irradiation luminesces from the background of a carrier under fluorescent action. Detection is performed by testing the bar code signal F(t) within each area (ZG1, TIS) within which a bar may be expected, against a bar criterion (THR, MTHR) obtained by prediction, with the aid of a prediction table (TABLE 1), from a local background signal value (AGR) locally derived from the bar code signal F(t). In this method use is made of the fact that, first, between the bars the background of the carrier is invariably present, making a periodical reliable background approximation from the bar code signal value possible, and, second, there is a certain correlation between a background and the additive signal contribution as a response of the bars luminescing from that background under irradiation. The prediction table is compiled beforehand from series of values—obtained with the aid of a test set of letters—for the average background signal, the maximum variation thereof, and the corresponding minimum bar response. The properties of the bar ink used and the pickup means (5, 61) for obtaining the bar code signal are expressed in these values. The advantage is that background influence, notably as a result of the local or global luminescence of the background itself, no longer adversely affects the reliability of a 'bar/no bar' decision.

5 Claims, 3 Drawing Sheets

BAR CODE DETECTION USING BACKGROUND-CORRELATED BAR CRITERION FOR ASCERTAINING THE PRESENCE OF A BAR

This application is a continuation of application Ser. No. 07/547,691, filed Jul. 2, 1990 now abandoned.

A. BACKGROUND OF THE INVENTION

1. Field of the Invention

The invention relates to the reading of bar code patterns applied to carriers for the carriers to be automatically recognized. It concerns a method of detecting a bar code from a bar code signal which essentially forms a cross-section of a bar code pattern which, through irradiation, luminesces from the background of a carrier. The invention also comprises an apparatus for reading such a bar code pattern.

2. Description of the Prior Art

In automatic postal processing systems, as is well known, bar coding is used for sorting according to destination, for instance. To that end, at the input of such a system, for instance by means of video coding, each letter to be processed in such a system is provided with a processing code in bar code form. The processing code may be a destination code, as a postcode, derived from the destination address provided on the letter. At one or more decision points in the process the bar code is read. Reading the code basically comprises the following steps:

a. picking up an image signal of the physical bar pattern on the carrier by passing it along optical scanning means;
b. detecting the bar pattern from the image signal and indicating, for instance in digital form, "bar/no bar" and, if applicable, the type of bar (e.g. thick/-thin), for each position in the bar pattern;
c. decoding the detected bar pattern.

On the one hand, a bar pattern provided on the carrier should be as inconspicuous as possible, but on the other it should be readily distinguishable from any other printing when read automatically. Accordingly, such bars are typically applied to a carrier in an ink that emits light under luminescent, particularly fluorescent, effect. A bar code signal of a luminescent bar code pattern can be read using transducing means such as known, for instance from Dutch patent specification NL 164980. For the bar pattern on the carrier to luminesce, it is to be subjected to focussed irradiation using UV light, for instance. Here, a specific problem arises, namely that of background influence due to such irradiation. This means that irradiation will not only cause the bars written in fluorescent ink to luminesce, but also their background, wholly or locally, which is a fact to be taken account of. This is the case when envelopes used for letters are made of paper containing so-called "whiteners", which have fluorescent properties. The same problem presents itself when other writing or printing in fluorescent ink extends into the zone of the letter where the bar pattern is applied. Moreover, it has turned out that a luminescent background may act as an amplifier of the luminescent effect of the bars themselves. Major variances may then arise in the signal amplitude of the image signal read, not only in bar code signals of successive letters, but even within one and the same bar code signal. This may weaken the reliability of the signal information used to make "bar/no bar" decisions.

When the bar code used is of the 'mark space' type, the background influence also makes it more difficult to detect spaces in a bar pattern. In short, the problem is basically one of finding a reliable signal threshold or another criterion for each "bar/no bar" decision to be taken.

B. SUMMARY OF THE INVENTION

The invention offers a solution to the problem stated hereinabove. It is based on the experimental experience that, first, a reliable background approximation from the bar code signal values is always possible in virtue of the fact that the background of the carrier is invariably present between the respective bars, and, second, there is a certain correlation between a background and the additive response of the bars luminescing from the background under irradiation. Using this experience, the method according to the invention is characterized in that the bar code signal within each signal area in which the bar code signal may be expected to have a bar signal value corresponding to a bar, is tested against a bar criterion obtained through prediction from a local approximated background signal value derived from the bar code signal in that signal area. This means it is possible to make a reliable prediction for each bar area to be examined about what criterion the signal values within that area should meet for a bar to be detected or not within that area, on the basis of a priorly established correlation between the local background signal value and the additive response of a luminescent bar pattern. Since such a correlation is also a reflection of the properties of the ink used and the properties of the pickup used, the operation according to the invention is further characterized in that the prediction is carried out with the aid of a priorly compiled prediction table.

Further preferred features and embodiments of the invention are summarized in the other subclaims and described in detail with reference to the drawings.

C. References (1) Dutch patent specification NL 164980
Title: Optical reading head
(2) Dutch patent specification NL 183790
Title: Method for character segmentation

D. BRIEF DESCRIPTION OF THE DRAWINGS

The invention will be further explained with reference to the drawings, in which.

Figure 4:
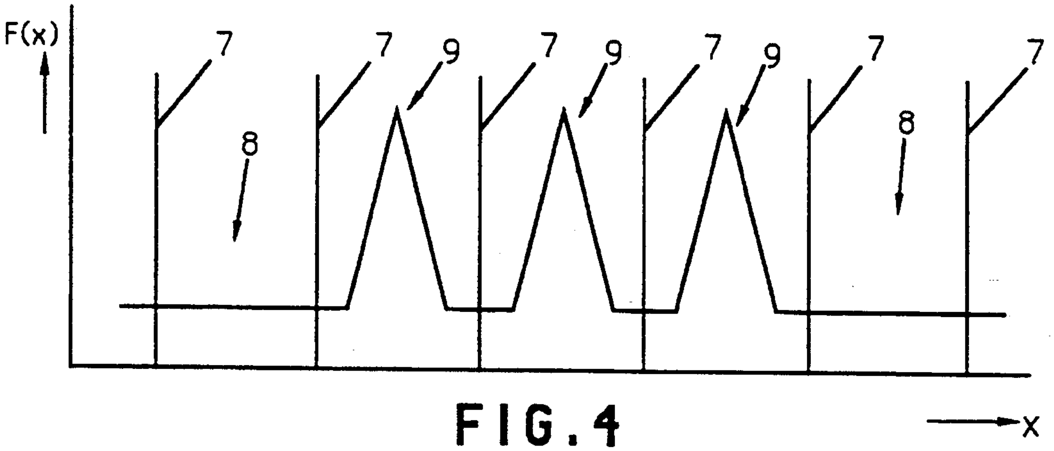
FIG. 4 shows the convolution F(x) of F*(x) with H(x), in theory.
Figure 6:
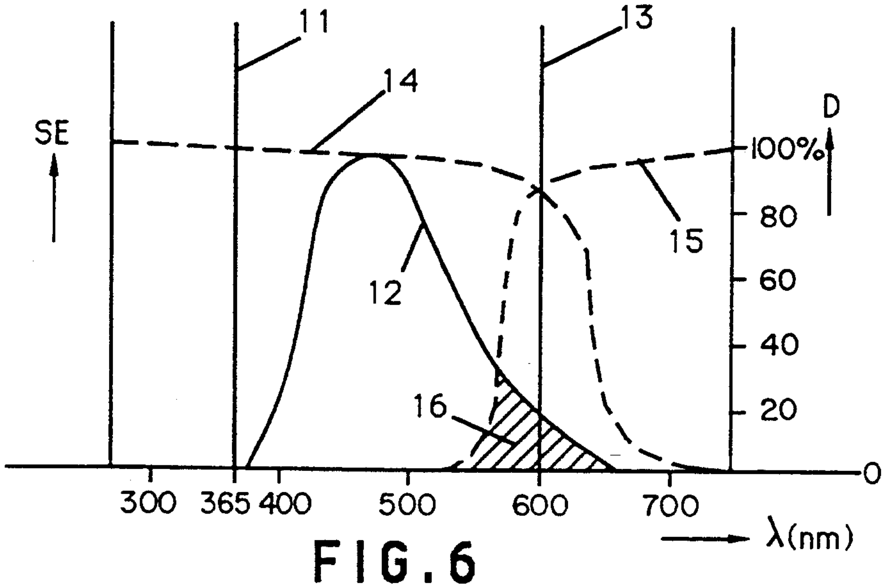
Figure 7:
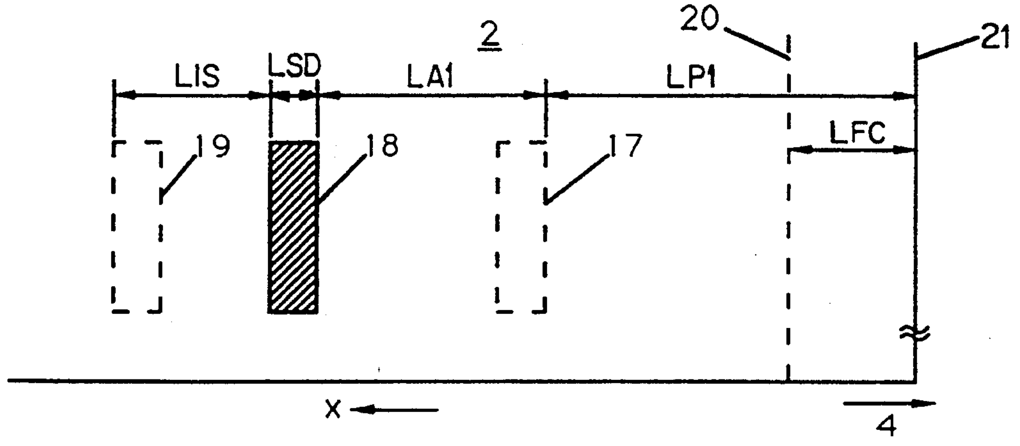
Figure 8:
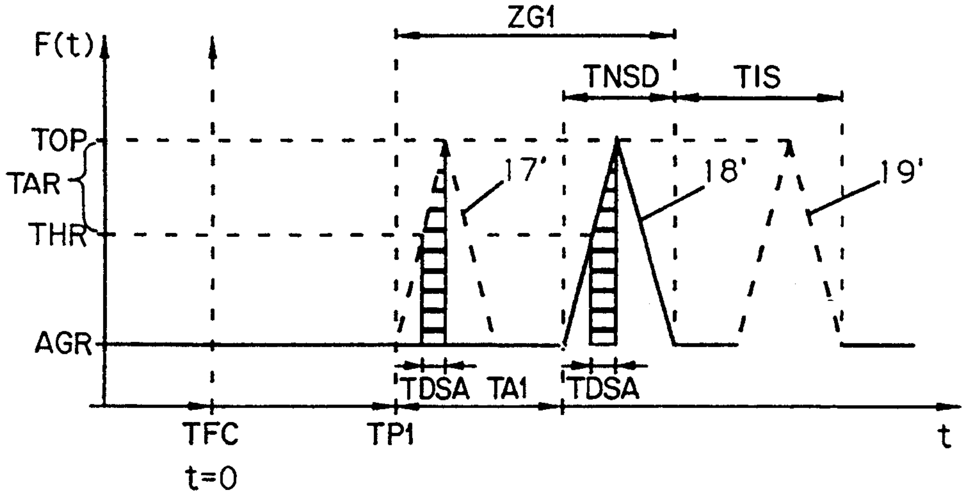
Figure 9:
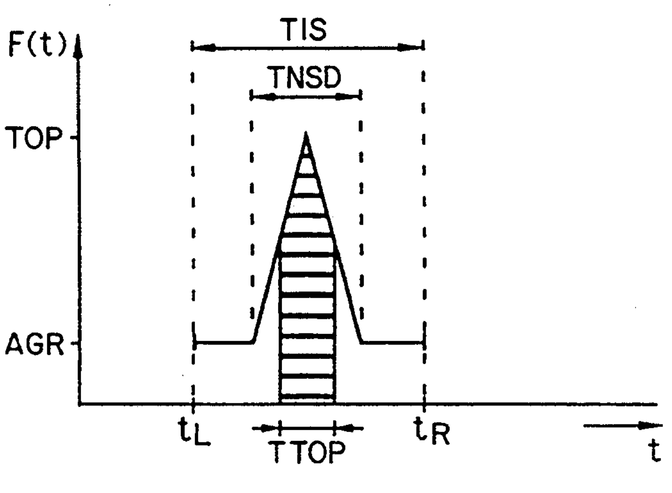

FIG. 6 schematically shows the spectral distribution of the light emission of carriers containing fluorescent pigments;

FIG. 7 shows a part of the index zone of a carrier with the outermost positions of the first bar;

FIG. 8 shows an index signal of the part shown in FIG. 7, viewed in the time according to a convolution as shown in FIG. 4;

FIG. 9 shows the signal of an index bar.

E. DESCRIPTION

E. 1 Introduction

For the purpose of automatic postal processing, a destination code on a letter postal item, for example in the form of a postcode, is translated into a bar code, here called an index, and applied to the letter in a fluorescent ink (printed, written, or sprayed). For the Netherlands, the postcode consists of four numerical and two alphabetic signs (characters) separated by a space. In a video coding operation, for instance, this information is encoded into a bar pattern consisting of 36 successive segments, 6 units of 6 segments per sign, with a nominal pitch of 1.66 mm. In each of these segments a vertical bar may be disposed with nominal dimensions of 0.5 mm width and 5 mm height. The encoding is such that each unit starts with a bar and, in addition, can be represented by a bit pattern of zeros (no bar) and ones (bar). The reading of the index is based on the fluorescent properties of the bar ink.

Figure 1:
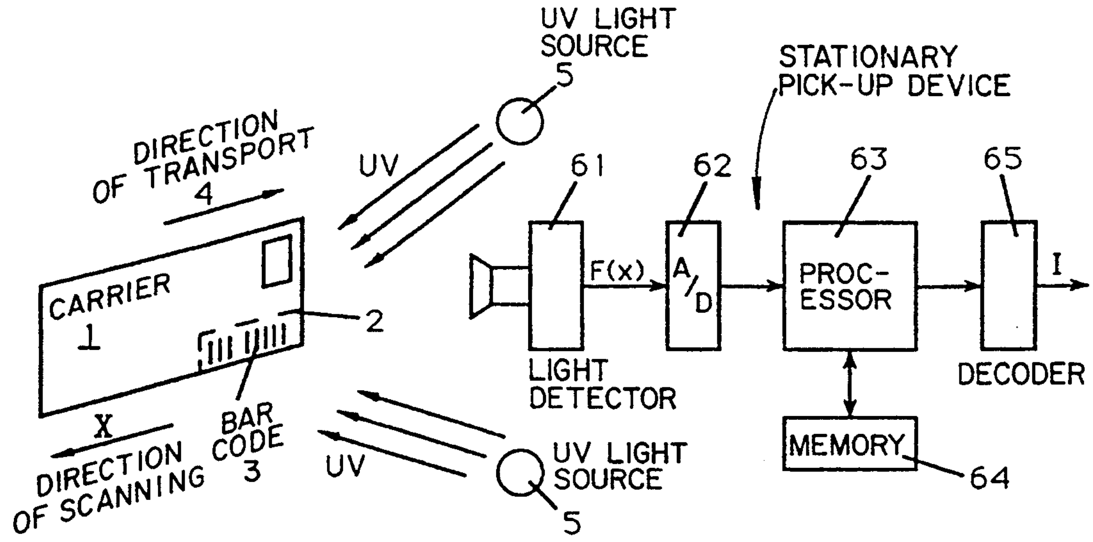
FIG. 1 shows an apparatus for obtaining an index signal F(x) and for detecting an index from this index signal and decoding an index.

FIG. 1 schematically shows how a letter 1 with an index pattern 3, also called 'index' for short, provided in an index zone 2 specifically intended for the purpose, is passed along a UV light source 5 emitting UV light of 365 nm, and a pickup 61, at a transport rate of about 3 m/sec and a frequency of 8 letters/sec in a transport direction 4 for the index 3 to be read. Irradiated by the UV light, the fluorescent bars of the index 3 light up from a background formed by the material of the letter. Due to this luminescence, an optical signal is generated which is subsequently picked up by the pickup 61 and converted into an electric index signal F(x). Then, in known manner, this signal is sampled, converted into a digital signal by means of A/D converting means 62, and under control of a processor 63 temporarily stored in a memory 64 accessible for further processing. The further processing comprises the detection proper of the index pattern from the stored digital signal values, and is carried out by the above-mentioned processor 63 using programmes based on the new method of detection according to the invention to be described hereinafter. The detected index pattern, the bar code, is then decoded into index I, the destination code proper, with the aid of decoding means 65, and used for further processing of the carrier of the index pattern corresponding to this index.

E. 2 Analysis of the Index Signal F(x)

Figure 2:
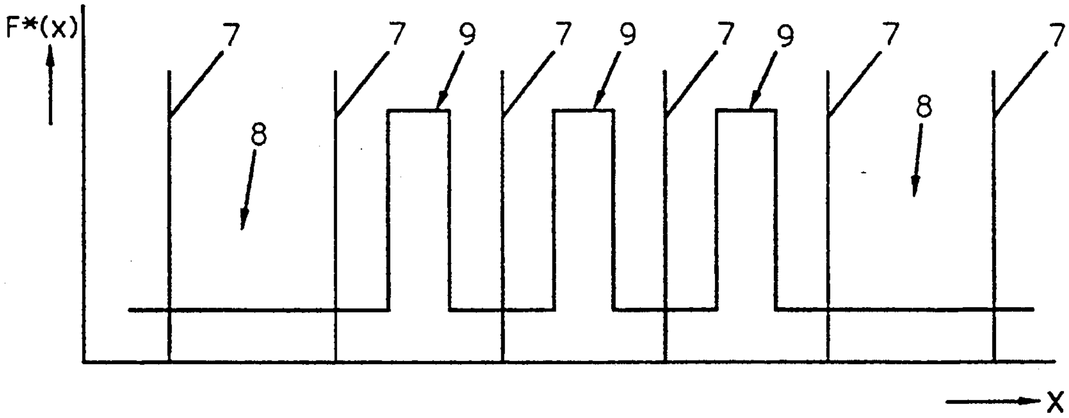
FIG. 2 shows an ideal index signal F*(x)
Figure 3:
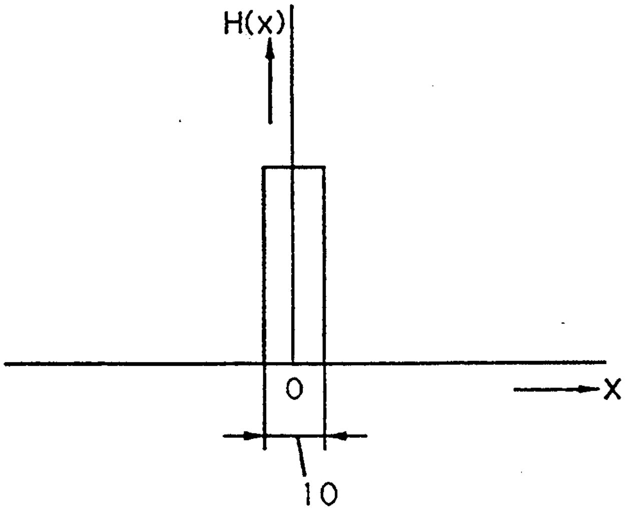
FIG. 3 shows the transfer function (PSF) H(x) of the pickup used.

The electric index signal F(x) in fact represents a cross-section of the index 3 on the letter postal item 1 scanned in a direction x, opposite to the direction of transport 4. The pickup 61 is required to have a distinctive resolving power in the direction x. If its resolving power were infinitely great, in such an ideal case F would look like the fictive signal F*(x). A part of the form of such a signal is shown in FIG. 2 as a function of x covering five segments, the signal in each segment—the segment separation is designated by 7—indicating either a space 8 or a bar 9. In practice, however, the pickup has a finite resolving power, on account of the fact that the index pattern 3 is picked up with a pickup provided with a vertical slit (i.e. vertical to the direction of transport x) having a finite width, preferably chosen to be equal to the nominal width of an index bar, which is 0.5 mm in the present case. The pickup accordingly has a transfer function (Point Spread Function [PSF]) designated by H(x) in FIG. 3, which is uniform across the slit width 10 and zero outside of it. F(x) can thus be represented by the convolution of F*(x) with H(x):

$$F(x)=F^{*}(x)\times H(x) \quad (1)$$

Figure 5:
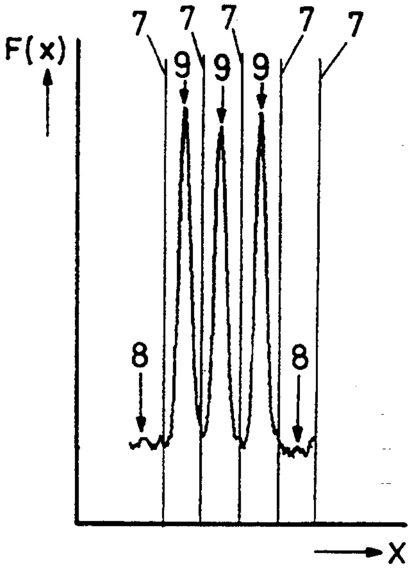
FIG. 5 shows ditto, in practice.

The theoretical form of F(x) is shown in FIG. 4 and a corresponding signal in practice in FIG. 5, where 7 again indicates the segment separation, 8 a space and 9 an index bar.

The signal F(x) is built up from three signal components, the component coming from the paper background, the emission of the fluorescence pigments of the ink used for the index bars, and the noise in the pickup system.

$$F(x)=A(x)+I(x)+R(x) \quad (2)$$

wherein

A(x): Background component

I(x): Index component

R(x): Noise component

The first two components themselves are each composite and will be subjected to further consideration. A substantial part of the noise component consists of paper noise, but also the pickup used for obtaining an electric index signal F(x) contributes to the noise. It will be shown that by using the invention, the influence of the noise component on the detection result is implicitly taken into account, or rather, eliminated, and thus taking special measures is not required.

E.2.1. Background Component A(x)

Experiments have shown that the background component is mainly determined by the optical properties of the paper. In the first instance they are assumed to be homogeneously present throughout the index zone 2. The background component in "uncontaminated" index zones can be defined as:

$$A(x)=AP \quad (3)$$

AP: Background primary

When the paper merely reflects (and does not fluoresce), AP will only consist of the reflected UV light. This is filtered out in the optical system by an optical low-pass filter (for wavelengths from about 580 nm). Therefore, reflected radiation with a wavelength of 365 nm does not contribute to A(x).

However, most types of paper used for envelopes contain so-called "whiteners". These are substances with a variety of fluorescent pigments which, together, have a whitening effect. When such paper is irradiated with UV light, an emission occurs with a spectral distribution as schematically shown in FIG. 6. FIG. 6 shows, on the one hand, the radiation energy SE (random scale) of the UV source emission 11, the "whitener" emission 12, and the index emission 13, respectively, as a function of the wavelength in nm, and, on the other, the passed quantity D in percentages of this radiation energy SE, limited by the sensitivity 14 of the photo multiplying tube used in the pickup 61 and the low-pass filter function 15 referred to hereinabove. This spectral distribution has a non-negligible extension beyond 580 nm to be accordingly observed as a contribution to A(x) (schematically represented by the hatched area 16 of FIG. 6). However, when the index zone is "contaminated" by (non-fluorescent) printing, variance will occur in the background contribution. Such printing brings with it a damping of the background signal, which can accordingly be defined as:

$$A(x)=a1(x).AP \quad (4)$$

wherein a1(x): damping factor at the location of the printing.

The following applies to the damping factor:

$0 \leq a1(x) \leq 1$, a1(x)=1 for x without printing a1(x)<1 for x with printing.

In practice the values of a1(x) are between 10% and 100%.

In practice there have also been instances of printing in "narrow-band" fluorescent ink, applied with a so-called "marker" pen, for example. They exhibit the same behaviour as the index bars, but have different dimensions. A non-fluorescent printing can only dampen the reflected or the emitted radiation of the background and accordingly appears as a damping factor in the formula. A fluorescent printing itself emits light (as does the index) and thus makes a contribution of its own to the background signal. This leads to an additive component AF(x).

$$A(x)=AP+AF(x) \quad (5)$$

wherein

AF: background fluorescent component.

Therefore, the background component can be generally defined as:

$$A(x)=a1(x).AP+AF(x) \quad (6)$$

E.2.2. Index Component I(x)

Practice has shown that the conception of an index bar as lighting up from its background under the influence of UV light is too simple. One of the most marked phenomena in fluorescent indexes is the great influence of the background on the signal amplitude of the index bars. When the index signals of a dark letter and a white letter are compared, the index bars on the letters themselves do not turn out to differ very strongly, but they do in the signals: the index bar amplitude of the dark letter is approx. 400 mV, whereas that of the white letter >15 V!

When it is assumed that the background of the dark letter hardly contributes to the index bar amplitude, this amplitude is exclusively determined by the UV radiation striking the bars directly. Accordingly, in this case the index component is defined as:

$$I(x)=IP(x) \quad (7)$$

wherein

IP(x): index primary component

This primary component then has an amplitude contribution of approx. 400 mV. However, when the signal comprises a clear background contribution, the index bar amplitude is many times larger. Upon further examination, it turns out there is a fairly constant correlation between the index bar amplitude and the background value. Expressed in formulaic form:

$$I(x)=IP(x)+IS(x) \quad (8)$$

$$=IP(x)+a2(x).A(x)$$

$$IS(x)=a2(x).A(x)$$

wherein

IS(x): index secondary component a2(x): correlation factor

In practice it turns out that a2(x) is roughly between 5 and 8. The background, therefore, seems to act on the index emission as an amplifier. In other words, the index bar signal I(x) is determined as to a much greater part by secondary excitation by the background than by direct irradiation with UV! This is an important conclusion, especially when contamination of the index zone is considered.

When non-fluorescent background with damp factor a1(x) is involved, A(x) can be defined as [see (4)]:

$$A(x)=a1(x).AP$$

Formula (8), in turn, defines:

$$I(x)=IP(x)+a2(x).A(x) \quad (9)$$

therefore:

$$I(x)=IP(x)+a1(x).a2(x).AP \quad (10)$$

The contribution of IP(x) is small in comparison with a2(x). A(x), so that the index amplitude is virtually exclusively determined by the latter component. In the case of background printing, however, this term is weakened by a factor a1(x), which may decrease to 10% or further! This means that such printing interfering with the index bars causes a very large variance in the index bar amplitude.

E.3. Statement of the Problem

In summary it may be said that the relevant information in the index signal F(x) is represented by the component I(x). It comprises a primary component IP(x) making a fairly small amplitude contribution of little variation, and a secondary component IS(x), which may give rise to very large variations in the peaks of F(x). Although the background amplitude may also vary strongly (fluorescent contamination of the index zone 2 [FIG. 1]), it is invariably (amply) exceeded by a bar contribution in the amplitude signal (amplifier effect). But precisely such possibly large variations in the index signal F(x) both of the background component A(x) and of the additive index component I(x) proper make it difficult to reliably establish the presence of a bar or a space in a part of the index signal under examination. A peak approximation using conventional peak follow methods is inadequate here, since such an approximation is sensitive to successive spaces.

E.4. The Detection Algorithm

Starting from the fact that it has been experimentally established that a) a reliable background approximation is always possible ("background" is present between all the bars), and b) there is a correlation between a given background and the additive response of fluorescent bars applied to it, an index detection algorithm has been developed in which the most critical aspect of the method, namely the peak approximation, is replaced by a prediction of the index bar response. This prediction is made with the aid of a prediction table (see Table 1) on the basis of a locally determined background signal amplitude. This table takes account of the properties of the UV light source/signal pickup combination (5, 61) used and the ink used. Such a table is compiled beforehand using the correctly detected index signals from a test set of letters. See under E.4.4. below.

The detection algorithm proper comprises two subalgorithms (i) the detection of a possible first bar, and (ii) a segmentation and classification algorithm of the first bar and each successive bar.

Both the detection of the position of a possible first bar and the actual determination of the presence and the best position of the first bar and each successive bar are carried out on the basis of the above-mentioned prediction with the aid of the prediction table. With a view to a more detailed discussion of the subalgorithms mentioned, a further signal description will be given first.

E.4.1. Signal Description in View of the Algorithm

FIG. 7 shows a part of the index zone 2 of a letter 1 moving in a direction 4 along the pickup 61 (FIG. 1), with the index pattern in the direction x being scanned from the letter edge 21. Of the index pattern the first bar is shown in two positions 17 and 18 at a minimum possible distance from the edge 16 and at a maximum possible distance from the edge 16, respectively, and a possible second bar 19 at pitch distance from position 18 of the first bar. A broken line 20 designates the position of the letter 1 relative to the centre line of the pickup 61 at the moment when edge detection occurs. Edge detection is carried out using for instance a photo cell arranged along the letter transport line.

Further references in FIG. 7 have the following meaning:

LFC: position of the letter upon edge detection
LP1: minimum position 17 of the first bar
LA1: maximum deviation of the first bar relative to the minimum position referred to
LIS: pitch
LSD: bar width FIG. 8 shows a corresponding index signal F(t) viewed in time, picked up by a pickup provided with a vertical slit with a width OSB equal to the nominal width of the index bar used in the index pattern. Corresponding first and second bar positions are indicated by 17', 18', 19', respectively. Further references in FIG. 8, now viewed in time, have the following meaning:

TFC: moment of letter edge detection (t=0)
TP1: minimum 'position' of the first bar
TA1: maximum deviation of the first bar
TIS: pitch
TNSD: 'bar width'
TAR: target area
TDSA: width of a target area
AGR: (approximated) background amplitude
THR: threshold value
TOP: bar amplitude peak value The signal F(t) is stored chronologically—from the moment t=0 when the pickup is switched on after edge detection up to a moment T which, using a safety margin, is well beyond the moment when the last index bar has passed the pickup 61—and digitally in an addressable memory, for instance at a sampling interval of 23 μsec and a sampling step of 15 mV. Thus, the time differences in fact become address differences and signal level differences become differences in address content. Hereinafter the digitized signal values for $0 \leq t \leq T$ will also be designated by F(t) since the chances of misunderstandings arising are small and the readability is thus promoted.

E.4.2. Detection of the First Bar

Referring to FIG. 8 the subalgorithm in respect of the detection of the first bar (FIG. 7: 17, 18) will be explained.

The first bar is located in a search area ZG1, where $$TP1 \leq t < TP1 + TA1 + TNSD \quad (11)$$

i.e. between the outermost positions of the first bar indicated by 17' and 18'. The detection of the first bar comprises a first broad detection and a second, finer detection. First the search area ZG1 is broadly stepped through at a step which is selected to be equal to the width TDSA of a target area TAR $$TDSA = (1\text{-}ALPHA)*TNSD/2, \quad (12)$$

namely, half the width of that part of a theoretical bar amplitude which exceeds a threshold value THR. THR is defined as $$THR = AGR + VARAGR + ALPHA * CONTRAST \quad (13)$$

wherein

AGR: approximated background amplitude
VARAGR: background variation (in AGR from Table 1)
ALPHA: detection parameter (between 0 and 1), experimentally determined
CONTRAST: difference between the expected minimum additive response RESP and the maximum background variation VARAGR (also from Table 1)

The approximated background amplitude AGR at the moment t, with each step of the width TDSA carried out, is determined as the greatest value of LMIN and RMIN, LMIN and RMIN representing the smallest signal amplitudes found in the time intervals t-TIS to t and t to t+TIS, respectively, i.e. in areas to the left and to the right of t with a size of the pitch.

When at a certain time t=t0, F(t0) is greater than the instantaneous threshold THR, then the second, finer detection method is carried out which is in fact (selected to be) equal to the method for the detection of each successive bar. See the segmentation and classification function under E.4.3. to be described in greater detail hereinafter. This finer detection scans the area between t0-TIS/2 and t0 with small steps, namely per sample (i.e. sampling interval), selects the best position of a segment possibly containing a bar (segmentation), and checks whether this segment actually contains a 'bar' (classification). If this is not the case, the process continues with the first broader detection with t0 as the new start position.

The detection of the first bar is terminated when:

a. the detected first segment is actually classified as a bar segment, b. no bar segment is found in the searching area ZG1.

After b. the detection is discontinued and a 'reject' code is generated. After a. the determined position of the first segment is used for segmenting and classifying the next segment.

E.4.3. Segmentation and Classification

When the position of the first segment is determined it seems easy to sequentially segment the further signal F(t) at a fixed pitch TIS. However, this would only be the case if in practice, too, the bars could be applied at a constant pitch. In practice, however, a certain specified pitch tolerance should be taken into account. Moreover, the time-dependent signal F(t) is also influenced by variations in the transport rate of the letter. For that reason, the best positions of the successive segments are periodically determined by repeating in each segment the search for the best position within a synchronisation area, which is defined by the pitch tolerance. The pitch TIS, however, is expressed in the number of samples and has a tolerance of 1 sample in the present embodiment. Such a method of segmentation, in which a pitch tolerance is taken into account, is known per se as a special case (since only one value for the pitch size is used) from Dutch patent specification 183790.

FIG. 9 once again shows the theoretical signal of a segment with a bar. Such a segment generally has the following properties:

(i) the signal value of the index signal F in the middle area is greater than the signal values F(tL) or F(tR) at the left-hand edge tL or the right-hand edge tR of the segment.

(ii) the signal values F(tL) and F(tR) of left-hand edge tL and right-hand edge tR are not very different.

Starting from this, the signal value in the middle area of a segment is defined as integrated value IMID during a time interval TTOP

TTOP=GAMMA * TNSD (14)

wherein

GAMMA: a detection parameter between 0 and 1,

TNSD: the bar width.

The extent to which property (i) is present is expressed in a first distinctive feature

SMATCH=IMID-ILEFT-IRIGHT (15)

wherein

IMID: the integrated value during TTOP,

ILEFT: the signal value F(tL) on the left-hand edge of the segment,

IRIGHT: the signal value F(tR) on the right-hand edge of the segment.

The extent to which both properties (i) and (ii) are present is summarized in a second distinctive feature

SCORE=SMATCH-[ILEFT-IRIGHT] (16)

The second distinctive feature SCORE is a measure of the balance between left and right. Within the synchronization area that segment position is looked for in which the second distinctive feature SCORE is largest.

The first distinctive feature SMATCH is used for classifying the segment as a bar or space segment. To that end it is tested against a threshold MTHR which is determined depending on an approximated background signal value AGR found in the segment in that position where SCORE is largest. MTHR is defined as:

MHTR=(TTOP-2) * AGR+TTOP * VARAGR+BETA * TTOP * * CONTRAST (17)

wherein:

AGR: approximated background signal value as the average of ILEFT and IRIGHT,

TTOP: as (14),

BETA: detection parameter for adjusting the extent of dependency on the bar response between 0 and 1, VARAGR: background variation (at AGR from Table 1), CONTRAST: difference between the additive minimum response RESP and the maximum background variation VARAGR (also from Table 1).

This threshold is chosen such that the part that is independent of the bar response equals the maximum of the distinctive feature SMATCH for a space. SMATCH for a space is at a maximum when:

ILEFT=IRIGHT=AGR (18)

*IMID=TTOP * (AGR+VARAGR)* (19)

This means that for the same background signal value AGR, the SMATCH value of a bar should be greater than that of a space; and the extent by which it should be at least greater is determined by the fraction BETA of the bar response in the middle area predicted with the prediction table (Table 1) for the approximated background signal value found. A threshold MTHR thus chosen offers the following advantages:

a) the chance of a space being misclassified as a bar is small, because the minimum MTHR (when BETA=0) equals the maximum of SMATCH of a space.

b) According as BETA is chosen to be smaller, more forms of bars where the response exceeds the background variations can be classified as bars, which renders the present method more generally applicable.

Accordingly, the classification proper is as follows: the segment is a 'bar' segment when SMATCH>MTHR and it is a space segment when SMATCH≦MTHR. When a segment is classified as a 'bar' segment, the position of this segment where SCORE is greatest is used as a start position (synchronisation) for a next segment to be examined. When a segment is classified as a 'space' segment the startposition for the next segment is the position of the preceding segment plus the nominal pitch TIS. In both cases the start position of the next segment to be examined is determined by the observed position of the present segment plus the nominal pitch TIS.

E.4.4. The Prediction Table

For each pickup a separate prediction table is to be compiled, Table 1 is an example. For the compilation of such a table a random known index detection method may be started from, or the index detection method according to the invention with a table for another pickup. A test set is selected of index signals properly detectable by such a method, of index patterns written in the same ink on random letters. By the same method, or possibly by hand, these signals are (again) segmented and classified as space or bar segments. Of each classified segment a background signal value, for instance the minimum signal value, and the maximum signal value are determined. Of each index signal—both of the space segments and of the bar segments—a histogram of the background signal values and a histogram of the maximum signal values are drawn up. On the basis of these histograms, for each background signal value found, maximum background variation and the minimum additive response of a bar are determined. The values thus found form three series, one of background signal values, one of maximum background variations and one of minimum bar responses. These series generally exhibit gaps in their sequence and therefore are supplemented with values corresponding with intermediate missing background signal values, for instance up to the sampling step of the digitized signal, and adjusted so that the whole shows a fluent course.

Table 1 shows the results for a test set of 80 letters. For each signal step of 40 mV for the background signal AGR (column 1) up to a certain maximum, the maximum background variations VARAGR (column 2) and the minimum additive response RESP (column 3) of an index bar are specified. Column 4, furthermore, lists the corresponding contrast CONTRAST, which is the difference in value between the minimum additive response RESP and the maximum background variation VARAGR for the same background signal value AGR. All values are expressed in mV.

In a table compiled in this way, the maximum possible contribution in a positive sense of the above-mentioned noise component [R(n) in formula (2)] is also taken into account in the values for the maximum background variation (column 2); and that same contribution in a negative sense is taken into account in the values of the minimum additive response of the bars (column 3), so that each of the CONTRAST values in column 4 in fact represents the minimum noise-independent part of a bar response, which may occur with the background signal value in column 1 corresponding with that CONTRAST value. It is precisely this measure CONTRAST which is used in the two bar criteria described hereinabove, namely the thresholds THR [formula (13)] and MTHR [formula (17)] for the provisional and definitive decision, respectively, on the presence of a bar or a space. Any influence of the noise component on this decision is therefore no longer present.

For the "on line" operation of the detection algorithm, this table is converted into a new table in the compilation/assembly phase of the detection programmes, at given values for the detection parameters ALPHA, BETA and GAMMA, by carrying out the operations according to the formulae (13), (14), and (17), in which new table during the on line operation, for an observed background signal value AGR, the values for THR and MTHR are directly found.

E.4.5. Parameter Adjustment

The results of the new detection algorithm are only influenced by the parameter choice of ALPHA, BETA and GAMMA.

The parameter ALPHA mainly influences the processing time. Its influence on the detection results, however, is limited, since the detection of the first bar incorporates the possibility of synchronising again when a false synchronisation is registered.

BETA indicates the required quality of the segments of the index bars. Too high a BETA may cause an incorrect classification, for a bar may be classified as a space. The reverse applies when BETA is too low. However, in virtue of the choice of the threshold value MTHR, the chance of a space being classified as a bar is small.

GAMMA influences the processing time of the segmentation and the classification. Together GAMMA and BETA influence the final results. The smaller ALPHA and BETA are, the less sensitive the algorithm will be to variations of the bars. Experimentally, ALPHA=BETA=GAMMA=0.1 is a good choice with the limit set for the processing time (<50 msec), a quantizing resolution of 15 mV and a sampling frequency of 43 kHz.

TABLE 1

| AGR | VARAGR | RESP | CONTRAST |
|---|---|---|---|
| 0 mV | 80 mV | 150 mV | 70 mV |
| 40 mV | 100 mV | 200 mV | 100 mV |
| 80 mV | 120 mV | 270 mV | 150 mV |
| 120 mV | 140 mV | 315 mV | 175 mV |
| 160 mV | 160 mV | 350 mV | 190 mV |
| 200 mV | 180 mV | 380 mV | 200 mV |
| 240 mV | 190 mV | 400 mV | 210 mV |
| 280 mV | 200 mV | 420 mV | 220 mV |
| 320 mV | 210 mV | 440 mV | 230 mV |
| 360 mV | 225 mV | 465 mV | 240 mV |
| 400 mV | 250 mV | 500 mV | 250 mV |
| 440 mV | 275 mV | 550 mV | 275 mV |
| 480 mV | 300 mV | 600 mV | 300 mV |
| 520 mV | 325 mV | 650 mV | 325 mV |
| 560 mV | 350 mV | 700 mV | 350 mV |
| 600 mV | 375 mV | 750 mV | 375 mV |
| 640 mV | 400 mV | 800 mV | 400 mV |
| 680 mV | 425 mV | 850 mV | 425 mV |
| 720 mV | 450 mV | 900 mV | 450 mV |
| 760 mV | 475 mV | 950 mV | 475 mV |
| 800 mV | 500 mV | 1000 mV | 500 mV |
| 840 mV | 525 mV | 1200 mV | 675 mV |
| 880 mV | 550 mV | 1400 mV | 850 mV |
| 920 mV | 575 mV | 1600 mV | 1025 mV |
| 960 mV | 600 mV | 1800 mV | 1200 mV |
| 1000 mV | 625 mV | 2000 mV | 1375 mV |
| 1040 mV | 650 mV | 2200 mV | 1550 mV |
| 1080 mV | 675 mV | 2400 mV | 1725 mV |
| 1120 mV | 700 mV | 2600 mV | 1900 mV |
| 1160 mV | 725 mV | 2800 mV | 2075 mV |
| 1200 mV | 750 mV | 3000 mV | 2250 mV |
| 1240 mV | 775 mV | 3050 mV | 2275 mV |
| 1280 mV | 800 mV | 3100 mV | 2300 mV |
| 1320 mV | 825 mV | 3150 mV | 2325 mV |
| 1360 mV | 850 mV | 3200 mV | 2350 mV |
| 1400 mV | 875 mV | 3250 mV | 2375 mV |
| 1440 mV | 900 mV | 3300 mV | 2400 mV |
| 1480 mV | 925 mV | 3350 mV | 2425 mV |
| 1520 mV | 950 mV | 3400 mV | 2450 mV |
| 1560 mV | 975 mV | 3450 mV | 2475 mV |
| 1600 mV | 1000 mV | 3500 mV | 2500 mV |
| 1640 mV | 1025 mV | 3550 mV | 2525 mV |
| 1680 mV | 1050 mV | 3600 mV | 2550 mV |
| 1720 mV | 1075 mV | 3650 mV | 2575 mV |
| 1760 mV | 1100 mV | 3700 mV | 2600 mV |
| 1800 mV | 1125 mV | 3750 mV | 2625 mV |
| 1840 mV | 1150 mV | 3800 mV | 2650 mV |
| 1880 mV | 1175 mV | 3850 mV | 2675 mV |
| 1920 mV | 1200 mV | 3900 mV | 2700 mV |
| 1960 mV | 1225 mV | 3950 mV | 2725 mV |
| >2000 mV | 1250 mV | 4000 mV | 2750 mV |

We claim:

1. A method for detecting a bar code from a response light signal of a first predetermined light wavelength received from a luminescent bar code pattern on a background surface of a moving carrier, which signal is responsive to light of a second predetermined wavelength irradiating said bar code pattern, the bar code pattern including a number of successive bar code positions each containing a bar code element from a predetermined set of two possible bar code elements, such as bar/no bar or thin/thick bar, the response light signal occurring during steady relative movement of said carrier with respect to a signal pick-up device for said response light signal, which device is equipped with a source of said light irradiating said bar code pattern, said response light signal pick-up device having means for converting said response light signal into an electric response signal, said electric response signal including a background signal produced during movement of said carrier by light emanating from said background surface of said carrier and a pulse signal produced by light emanating from each bar code element corresponding to a bar, which pulse signal is additive to said background signal, said method comprising the main steps of:

storing in memory the electric response signal during each said steady relative movement of said carrier with respect to said signal pick-up device for facilitating the performance of other substeps with the assistance of a processor, sub-dividing said electric response signal on a time basis by determining successively, in terms of relative movement of said carrier, a number of electric signal segments each of which corresponds with a bar code position, and classifying each said electric signal segment according to the bar code element contained in the corresponding bar code position, the main step of classifying each said electric signal segment comprising the following substeps:

deriving an approximated local background signal value from the electric response signal value corresponding to the background response light signal from a background corresponding to an electric signal segment under classification, generating a bar criterion signal which is a function of said approximated local background electric signal value, comparing the electric response signal of said electric signal segment under classification with said bar criterion signal, and generating a classification signal in a first sense if said electric response signal of said electric signal segment under classification exceeds said bar criterion signal and generating a classification signal in a second sense if said electric response signal of said electric signal segment under classification fails to exceed said bar criterion signal.

2. The method according to claim 1, wherein:

the step of generating a classification signal pertaining to successively adjoining signal segments is carried out sequentially, segment by segment, and a first signal segment is determined by selecting an initial signal segment from a search area, for said response light signal, of predetermined location on said carrier, said selected initial signal segment being one for which a classification signal in said first sense is generated for the first time during beginning of reading a bar code pattern.

3. The method according to claim 1, wherein:

the generation of the bar criterion signal is performed with the aid of a priorly compiled prediction table containing, for each of a plurality of background signal values in a range of possible background signal values, a value for the maximum background signal variation and a minimum value for a pulse signal corresponding to a bar, which values are obtained with the aid of a test set of carriers provided with a bar code supplied thereto in substantially the same ink which is luminescent under ultra-violet irradiation.

4. The method according to claim 1, wherein the response light signal emanates from a bar code pattern having a substantially fixed pitch, said pattern being of the "mark-space" type.

5. Apparatus for reading, during unidirectional movement of a carrier, a bar code embodied in a bar code pattern printed on said carrier, according to a predetermined spacing between centers of potential bars having the same logic significance, on a plane surface of said carrier in ink which is fluorescent in a predetermined light wave-length range under ultraviolet (UV) light, said bar code pattern being on an area located on said plane surface of said carrier in a predetermined distance relation with at least one edge of said plane surface of said carrier, said apparatus comprising:

stationary UV light irradiating means positioned for irradiating at least a substantial portion of said bar code pattern;

signal conversion means located adjacent to said irradiating means, for converting a light wave-length range wherein said bar code pattern has fluorescent properties into an electric response signal, said signal conversion means having a directional sensitivity and resolution suitable for distinguishing bar and carrier background fluorescence as said bar code pattern moves past said signal conversion means;

means for moving said carrier past said signal conversion means in a linear movement in a direction transverse to bars of said bar code pattern, beginning with movement of a first edge of said carrier past said signal conversion means, which edge is substantially parallel to said bars of said bar code pattern, and continuing with movement of said bar code pattern completely past said signal conversion means;

variable compensation means for effects of said background fluorescence constituted of a read-only memory having inputs corresponding to a set of magnitude ranges covering an expectable total range of magnitude of said electric response signal and means for supplying to said read-only memory said electrical response signal of said conversion means only while said conversion means has its directional sensitivity directed towards only background fluorescence, said read-only memory also having an output;

a reference signal generator having an input connected to said output of said read-only memory for generating a bar code reference signal, and a threshold circuit connected for comparing said bar code reference signal with said electric response signal of said conversion means and for providing and registering an output signifying whether said electric response signal is at least equal to said bar code reference signal, said variable compensation means, reference signal generator and threshold circuit being provided in the form of an electronic processor unit having a temporary memory for storing the output of said signal conversion means during each said linear movement of said carrier, and electric response signal segmentation means, responsive to movement of said carrier past said signal conversion means produced by said carrier moving means and connected for activation in response to an output of said threshold circuit that signifies that said electric response signal is at least as great as said bar code reference signal for the first time after said first edge of said carrier moves past said signal conversion means and, thereafter, for virtually subdividing said electric response signal into bar code segments corresponding to said minimum spacing between potential bar centers, by initiating a separate operation of said variable compensation means, of said reference signal generator and of said threshold circuit during each segment of said electric response signal timed by movement of said carrier past said signal conversion means produced by said carrier moving means, at least until an entire bar code pattern has been read, whereby said apparatus is provided with a tolerance for a background fluorescence under UV light of said carrier, which background fluorescence augments the total fluorescent light emanating from the bar code pattern in a manner that does not depend linearly on the magnitude of said background fluorescence.

* * * * *